United States Patent
Knauf et al.

(10) Patent No.: US 6,799,482 B2
(45) Date of Patent: Oct. 5, 2004

(54) WIPER BOARD FIXTURE

(75) Inventors: Richard Knauf, Roppenheim (FR); Richard Duesterhoeft, Boeblingen (DE)

(73) Assignee: Robert Bosch GmbH, Stuttgart (DE)

(*) Notice: Subject to any disclaimer, the term of this patent is extended or adjusted under 35 U.S.C. 154(b) by 183 days.

(21) Appl. No.: 10/070,086

(22) PCT Filed: Jun. 21, 2001

(86) PCT No.: PCT/DE01/02294

§ 371 (c)(1),
(2), (4) Date: Oct. 23, 2002

(87) PCT Pub. No.: WO02/04263

PCT Pub. Date: Jan. 17, 2002

(65) Prior Publication Data

US 2003/0052504 A1 Mar. 20, 2003

(30) Foreign Application Priority Data

Jul. 8, 2000 (DE) .......................... 100 33 383

(51) Int. Cl.$^7$ ............................................. F16H 21/00
(52) U.S. Cl. .................... 74/22 A; 403/348; 296/96.17; 15/250.29
(58) Field of Search ...................... 403/348; 296/96.17; 15/250.29, 250.49; 74/89, 25, 47, 51, 22 A

(56) References Cited

U.S. PATENT DOCUMENTS

| | | | | |
|---|---|---|---|---|
| 3,737,750 A | * | 6/1973 | Kearns | ........................ 318/443 |
| 4,557,622 A | | 12/1985 | Chalmers | |
| 4,962,564 A | * | 10/1990 | Onda et al. | ............... 15/250.19 |
| 5,960,512 A | | 10/1999 | Ortale et al. | |
| 6,364,570 B1 | * | 4/2002 | Egner-Walter | .............. 403/348 |
| 6,406,089 B1 | * | 6/2002 | Zimmer | ...................... 296/192 |
| 2002/0108200 A1 | * | 8/2002 | Lim | ........................ 15/250.13 |

FOREIGN PATENT DOCUMENTS

| | | |
|---|---|---|
| DE | 31 16 821 A | 11/1982 |
| DE | 36 21 233 C2 | 1/1988 |
| EP | 0 781 691 A1 | 7/1997 |
| FR | 2 733 473 A | 10/1996 |

OTHER PUBLICATIONS

Patent Abstracts of Japan vol. 2000, No. 14, Mar. 5, 2001 & JP 2000 318578 A, Nov. 21, 2000.

* cited by examiner

*Primary Examiner*—David Fenstermacher
(74) *Attorney, Agent, or Firm*—Michael J. Striker

(57) ABSTRACT

The invention is based on a fastening for a wiper mount (36) at at least three fastening points (38, 40, 42) on a vehicle body (44) by means of elastic bearings (48), wherein the first and second fastening point (38, 40) are disposed in the vicinity of wiper bearings (30, 32, 34) and the third fastening point (42) is disposed near a wiper motor (10), and the third fastening point (42) is adjustable such that the wiper mount (36) can be tilted about an imaginary axis through the first and second fastening points (38, 40).

Figure 1:
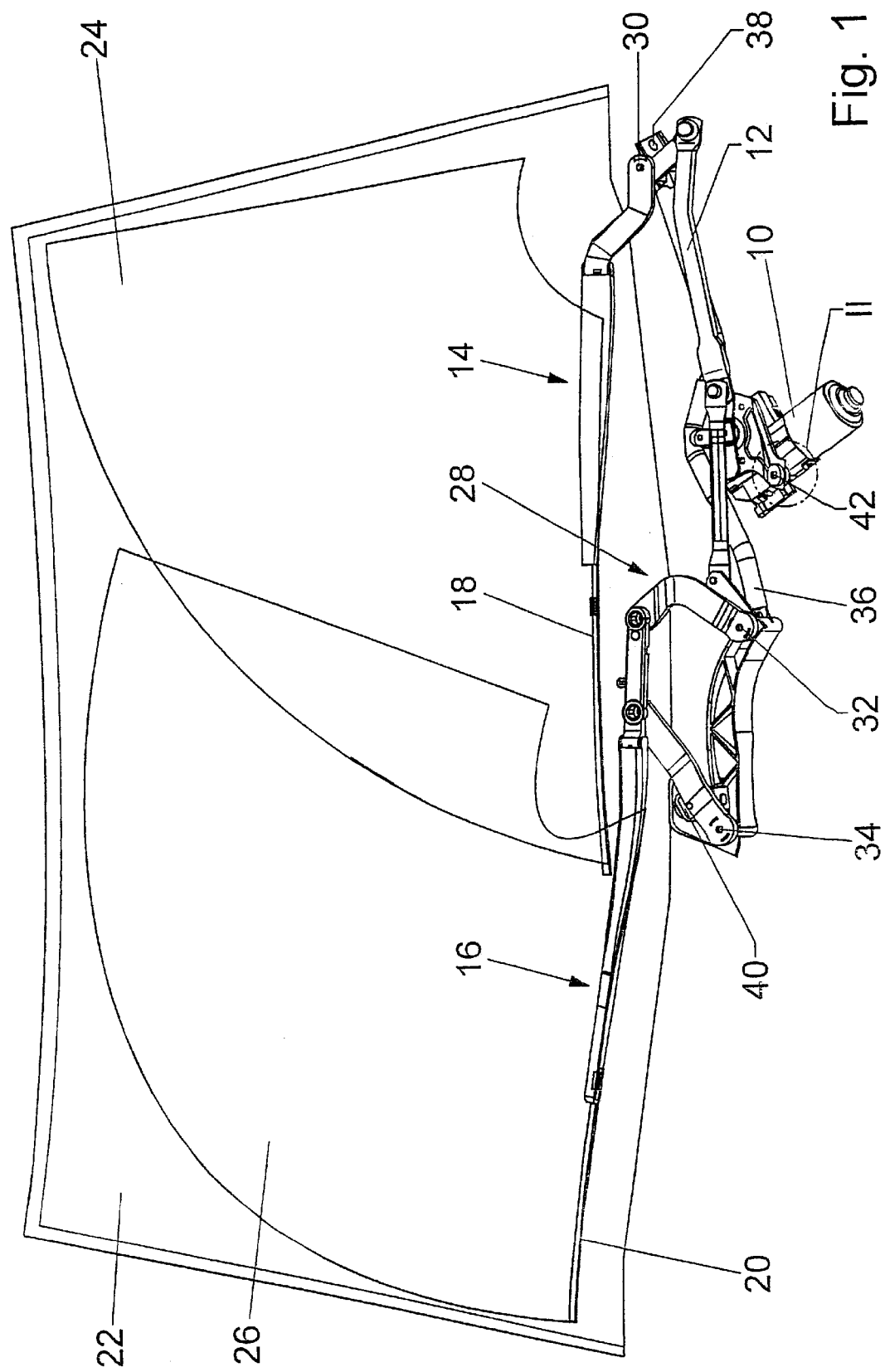

It is proposed that in the vicinity of the third fastening point (42), contact faces (58, 68) of the wiper mount (36) that face another, on the one hand, and a retaining element (46) secured nondetachably to the vehicle body (44), on the other, form an angle (δ), and between the contact faces (58, 68), a rubber-elastic element (48) whose end faces (56, 66) correspond to the contact faces (58, 68) is fastened by means of a screw (74).

4 Claims, 3 Drawing Sheets

WIPER BOARD FIXTURE

PRIOR ART

The invention is based on a fastening for a wiper mount as generically defined by the preamble to claim 1.

Such wiper mounts are used in particular in motor vehicles, for securing wiper systems to the body of the motor vehicle. The wiper mount includes a motor mount, which carries a wiper drive mechanism with a wiper motor and mounted on that a gear. A power takeoff shaft of the gear, as a rule via a crank and toggle links, drives cranks that are solidly connected to a drive shaft for each wiper. The drive shafts are supported in wiper bearings, whose bearing housings are secured to or formed onto the ends of the mount. The mount is secured to a vehicle body with rubber-elastic elements directly via the bearing housings or via fastening eyelets that are formed onto the bearing housing, the mount, and/or the motor mount. Such wiper mounts are known for instance from European Patent Disclosure EP 0 781 691 A1.

From German Patent DE 36 21 233 C2, a wiper blade is also known for cleaning curved windows of motor vehicles. To achieve a good outcome of wiping of a flat vehicle window, the wiper blade would have to be disposed such that its longitudinal center plane is perpendicular to the window when the wiper blade is relieved, and that a wiper lip, formed onto the wiper strip, merely touches the surface of the window. In spherically curved vehicle windows, the inclination of this longitudinal center plane to the window surface changes over the entire swept field. Moreover, the inclination of the longitudinal center plane also varies in the longitudinal direction of the wiper blade. Thus the optimal alignment in spherically curved vehicle windows during wiper operation can be attained only at individual points that migrate in the longitudinal direction of the wiper blade. Hence the deviations from the vertical, or normal to the vehicle window, which are measured in degrees of angle and are called normal deviations or normal errors, are greater in the more markedly curved side portions of the vehicle window than in the flat middle portions. The flexibility of the rubber wiper blade can compensate only partly for the normal deviation.

In practice, the requisite positioning angle of the wiper blade relative to the window and thus the normal error is usually accomplished by positioning the drive axes of the is wipers obliquely. The wipers thus assume a desired position that deviates from a perpendicular position relative to the vehicle window. The desired normal error is adjusted as a rule upon assembly of the wiper mount, by tilting the wiper mount relative to the vehicle window. To that end, at least one fastening point of the wiper mount on the vehicle body is adjustable.

ADVANTAGES OF THE INVENTION

According to the invention, in the vicinity of the third fastening point, contact faces of the wiper mount that face one another, on the one hand, and a retaining element secured nondetachably to the vehicle body, on the other, form an angle δ. Between the contact faces, a rubber-elastic element whose end faces correspond to the contact faces is fastened by means of a screw. Once the screw is loosened, the wedge-shaped rubber-elastic element can be adjusted between the contact faces of the wiper mount and of the retaining element in the direction of the inclination of the contact faces to one another in such a way that the spacing of the wiper mount from the retaining element changes. Since the wiper mount is elastically supported at the other fastening points, it is tilted about an imaginary axis through the other two fastening points, so that the wiper bearings solidly connected to the wiper mount assume a correspondingly altered angle to the vehicle window. Once the correct angle is set, the rubber-elastic element is tightened again by the screw between the contact faces of the wiper mount and the retaining element. For the adjustment and fastening, only a few components are accordingly needed. Moreover, this results in easy assembly and adjustment, with only one screw having to be loosened.

As a rule, the frictional engagement between the contact face of the wiper mount on the one hand and the contact face of the retaining element on the other and the respective end faces of the rubber-elastic element suffices to maintain the position once set. However, to improve the nonpositive engagement by means of a positive engagement, it is proposed in one feature of the invention that at least one end face of the rubber-elastic element comprises a hard material and with the associated contact face has a set of teeth meshing with one another, which extends transversely to the inclination of the contact faces. The set of teeth makes the adjusting process easier as well, since the angle can be varied in small, defined stages.

For the passage of the screw, the rubber-elastic element has an oblong slot, whose greatest length extends in the direction of the inclination of the contact faces. The longest possible adjustment path is thus achieved without overly weakening the cross-sectional area of the rubber-elastic element. Expediently, a guide sleeve of a hard material that engages the inside of the rubber-elastic part of the rubber-elastic element stabilizes the position of the rubber-elastic element transversely to the contact face, especially if the end face of the rubber-elastic element oriented toward the contact face is formed by a flange of the guide sleeve.

DRAWING

Further advantages will become apparent from the ensuing description of the drawing. One exemplary embodiment of the invention is shown in the drawing. The drawing, description and claims include numerous characteristics in combination. One skilled in the art will expediently consider the characteristics individually as well and put them together to make useful further combinations.

Figure 2:
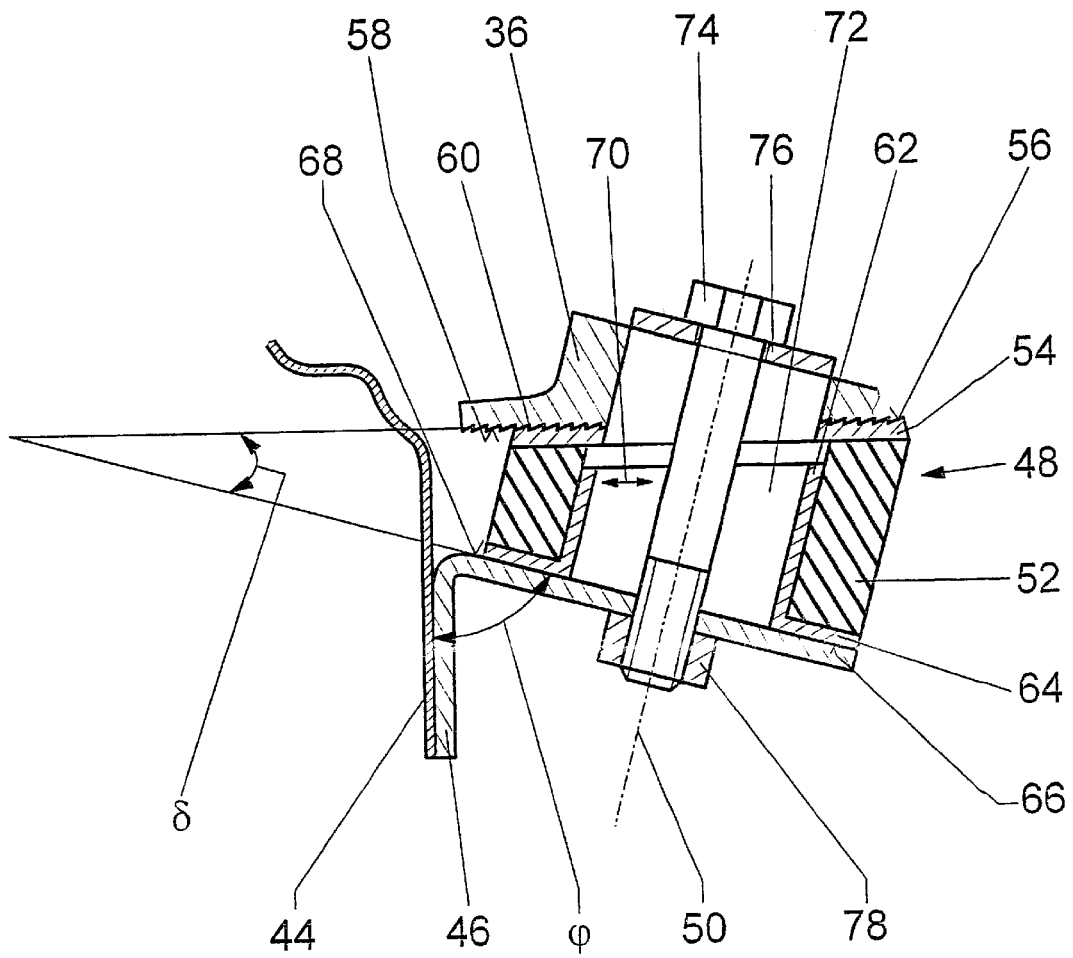
Figure 3:
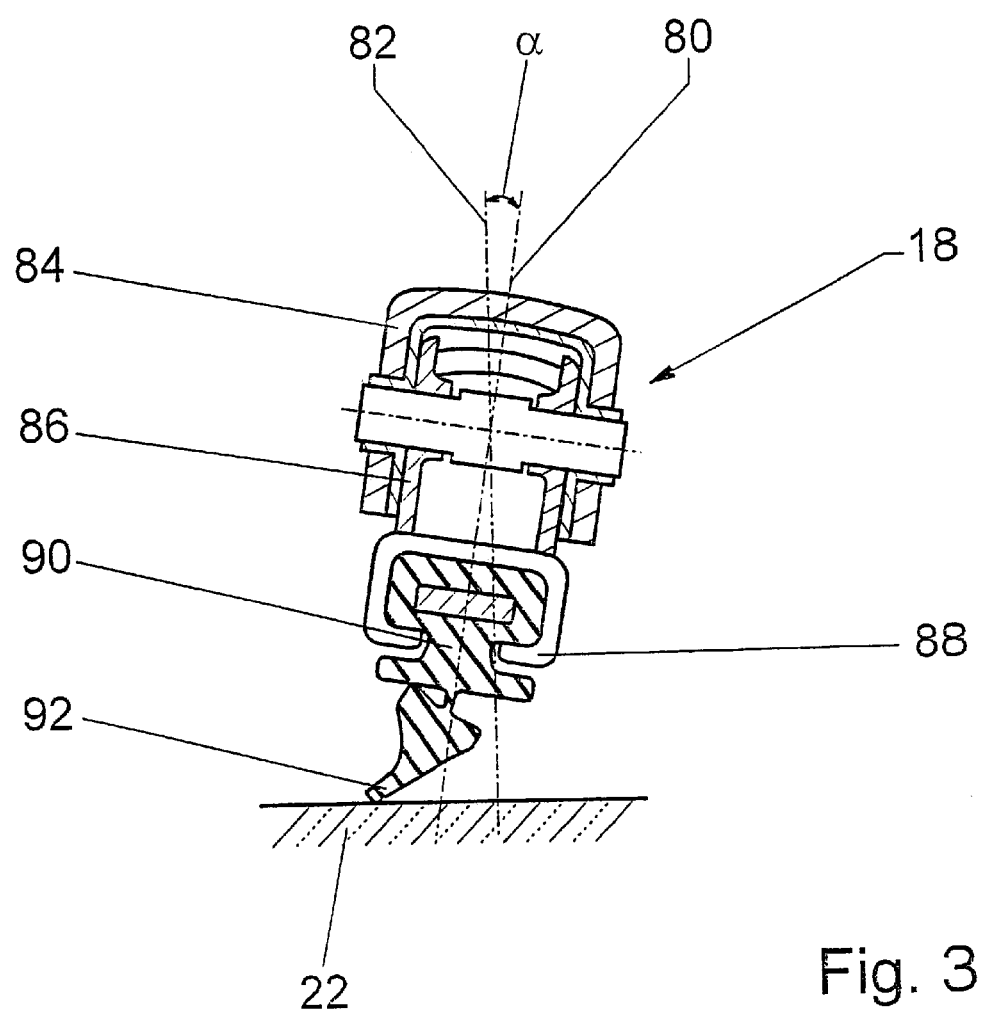

Shown are:

FIG. 1, a schematic view of a wiper system;

FIG. 2, an enlarged detail in section, taken along the line II—II of FIG. 1; and FIG. 3. a cross section through a wiper blade.

DESCRIPTION OF THE EXEMPLARY EMBODIMENT

The wiper system of FIG. 1 has a wiper motor 10, which via a wiper linkage 12 drives two wipers 14 and 16. During a wiping motion, the wipers 14 and 16, with their respective wiper blades 18 and 20, move over a vehicle window 22 along swept fields 24 and 26, respectively. While the wiper 14 is supported in a wiper bearing 30, the wiper 16 is driven via a four-bar wiper lever 28, which is supported in wiper bearings 32, 34. The wiper bearings 30, 32, 34 are disposed, together with the wiper motor 10, on a wiper mount 36, which is fastened to a vehicle body 44 (FIG. 2) at three fastening points 38, 40, 42. While the first and second fastening points 38 and 40 are disposed in the vicinity of the wiper bearings 30, 32, 34, the third fastening point 42 is located in the vicinity of the wiper motor 10.

The third fastening point 42 is shown in FIG. 2 in section on a larger scale. It includes an angular retaining element 46, which is connected solidly and nondetachably to the vehicle body 44. A contact face 68 on the free leg of the retaining element 46 together with the wall of the vehicle body 44 forms an angle φ, which in the example shown is less than 90°. A rubber-elastic element 48 is mounted on the contact face 68, and its end faces 56, 66 are fastened between the contact face 68 of the retaining element 46 and a contact face 58 of the wiper mount 36 by means of a screw 74 and a nut 78. Between the head of the screw 74 and the wiper mount 36, there is a shim 76 to reduce the pressure per unit of surface area and to cover the hole 72 for the passage of the screw.

The contact face 58 of the wiper mount 36 extends at an angle δ, inclined relative to the contact face 68 of the retaining element 46. The end faces 56 and 66 of the rubber-elastic element 48 extend accordingly. The inclination is represented by an arrow 70. The angle δ is selected such that an adequate adjustment path for the wiper mount 36 perpendicular to the contact face 58 results when the rubber-elastic element 48 is adjusted transversely to a longitudinal axis 50 in the direction of the inclination 70.

In the exemplary embodiment, the rubber-elastic element 48, toward the wiper mount 36, has a cover shim 54 of a harder material, which forms the end face 56. A set of teeth 60 that extends transversely to the inclination 70 is machined into the end face 56 of the cover shim 54 and into the contact face 58 of the wiper mount 36. The set of teeth serves on the one hand to reinforce the nonpositive engagement, created by the screw 74, with a positive engagement, and second to enable adjusting the rubber-elastic element 48 in a defined way and easily, in small stages, with only a few motions of the hand.

The hole 72 for the passage of the screw 74 is embodied as an oblong slot. Its greatest length is in the direction of the inclination 70, so that a long adjustment path is achieved with only little weakening of the cross section of the rubber-elastic element 48. The oblong slot 72 is engaged by a guide sleeve 62, which stiffens the rubber-elastic part 52 of the rubber-elastic element 48 transversely to the longitudinal axis 50. The guide sleeve 62 has a flange 64. This flange forms the end face 66, which rests on the contact face 68 of the retaining element 46. Between the guide sleeve 62 and the cover shim 54, a free space is left open so that the rubber-elastic part 52 has an adequate spring travel available.

FIG. 3 shows a cross section through the wiper blade 18. The longitudinal center plane 80 of the wiper blade 18 extends at an incline, by an angle α, to the normal 82 to the vehicle window 22. The angle α is known as the normal error or normal deviation. By the adjustment of the third fastening point 42, the angle α can be varied in a desired way. The wiper blade 18 substantially comprises a support bracket system 84, whose claw bracket 86, with its claws 88, holds a wiper strip 90. The wiper strip rests with a wiper lip 92 against the vehicle window 22.

What is claimed is:

1. A fastening for a wiper mount (36) at at least three fastening points (38, 40, 42) on a vehicle body (44) by means of elastic bearings (48), wherein the first and second fastening point (38, 40) are disposed in the vicinity of wiper bearings (30, 32, 34) and the third fastening point (42) is disposed near a wiper motor (10), and the third fastening point (42) is adjustable such that the wiper mount (36) can be tilted about an imaginary axis through the first and second fastening points (38, 40), characterized in that in the vicinity of the third fastening point (42), contact faces (58, 68) of the wiper mount (36) that face one another, on the one hand, and a retaining element (46) secured nondetachably to the vehicle body (44), on the other, form an angle (δ), and between the contact faces (58, 68), a rubber- elastic element (48) whose end faces (56, 66) correspond to the contact faces (58, 68) is fastened by means of a screw (74).

2. The fastening of claim 1, characterized in that at least one end face (56, 66) of the rubber-elastic element (48) comprises a hard material and with the associated contact face (58, 68) has a set of teeth (60) meshing with one another, which extends transversely to the inclination (70) of the contact faces (58, 68).

3. The fastening of claim 1, characterized in that the rubber-elastic element (48) has an oblong slot (72), whose greatest length extends in the direction of the inclination (70) of the contact faces (58, 68).

4. The fastening of claim 2, characterized in that the end face (66) of the rubber-elastic element (48) that is oriented toward the retaining element (46) is formed by a flange (64) of a guide sleeve (62) of a hard material, which sleeve engages the inside of the rubber-elastic part (52) of the rubber-elastic element (48).

* * * * *